US012393713B2

(12) United States Patent
Chen et al.

(10) Patent No.: US 12,393,713 B2
(45) Date of Patent: Aug. 19, 2025

(54) AUTOMATIC PROCESSING OF MEETINGS FOR CONFIDENTIAL CONTENT

(71) Applicant: INTERNATIONAL BUSINESS MACHINES CORPORATION, Armonk, NY (US)

(72) Inventors: Yu-Siang Chen, Minxiong Township (TW); Ching-Chun Liu, Taipei (TW); Joey H. Y. Tseng, Taipei (TW); Amanda P L Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 18/354,730

(22) Filed: Jul. 19, 2023

(65) Prior Publication Data

US 2025/0028847 A1    Jan. 23, 2025

(51) Int. Cl.
*G06F 21/62* (2013.01)
*G06N 20/00* (2019.01)
*G10L 15/06* (2013.01)
*G10L 15/18* (2013.01)
*G10L 15/08* (2006.01)

(52) U.S. Cl.
CPC ......... *G06F 21/6218* (2013.01); *G06N 20/00* (2019.01); *G10L 15/063* (2013.01); *G10L 15/18* (2013.01); *G10L 2015/088* (2013.01)

(58) Field of Classification Search
CPC . G06F 21/6218; G06F 21/6245; G06N 20/00; G10L 15/063; G10L 15/18; G10L 2015/088

See application file for complete search history.

(56) References Cited

U.S. PATENT DOCUMENTS

| 7,840,487 | B2 | 11/2010 | Hatano | |
|---|---|---|---|---|
| 9,736,214 | B2 | 8/2017 | Mendez | |
| 11,977,515 | B1 * | 5/2024 | Pham | G06Q 30/018 |
| 12,020,265 | B1 * | 6/2024 | Mao | G06Q 30/0243 |
| 12,164,503 | B1 * | 12/2024 | Khan | G06F 21/1014 |
| 2014/0108542 | A1 | 4/2014 | Cheng | |

(Continued)

FOREIGN PATENT DOCUMENTS

| CN | 119337169 A | 1/2025 |
|---|---|---|
| TW | 570711 B | 6/2016 |
| WO | 2011120573 A1 | 10/2011 |

OTHER PUBLICATIONS

Ali, "A simple Word2vec tutorial", Medium.com, https://medium.com/@zafaralibagh6/a-simple-word2vec-tutorial-61e64e38a6a1, Jan. 6, 2019, pp. 1-20.

(Continued)

*Primary Examiner* — Michael Won
(74) *Attorney, Agent, or Firm* — Elliot J. Shine (57) ABSTRACT

A method, computer system, and a computer program product for processing digital content is provided. The present invention may include building a sensitive sentence classification model. The present invention may include receiving a digital content, wherein the digital content is intended for one or more groups of content consumers. The present invention may include processing the digital content using the sensitive sentence classification model. The present invention may include generating a consumer specific digital content for each of the one or more groups of content consumers.

19 Claims, 3 Drawing Sheets

(56) References Cited

U.S. PATENT DOCUMENTS

| | | | |
|---|---|---|---|
| 2016/0080485 A1* | 3/2016 | Hamedi | G06Q 50/01 709/204 |
| 2016/0188725 A1* | 6/2016 | Wang | G06F 16/9535 707/734 |
| 2016/0203208 A1* | 7/2016 | Anderson | G06F 16/353 707/738 |
| 2016/0335674 A1* | 11/2016 | Plourde | G06Q 30/0251 |
| 2016/0350310 A1* | 12/2016 | Jurka | G06F 16/24578 |
| 2018/0137203 A1* | 5/2018 | Hennekey | G06F 16/9535 |
| 2018/0225710 A1* | 8/2018 | Kar | G06Q 30/0254 |
| 2018/0293678 A1* | 10/2018 | Shanahan | G06Q 10/103 |
| 2018/0337871 A1* | 11/2018 | Matta | H04L 67/306 |
| 2019/0034976 A1* | 1/2019 | Hamedi | G06Q 30/0243 |
| 2019/0052819 A1 | 2/2019 | Pogorelik | |
| 2019/0282155 A1* | 9/2019 | St Amant | G16H 40/63 |
| 2019/0354777 A1* | 11/2019 | Beck | G06V 20/52 |
| 2020/0042531 A1* | 2/2020 | Bhojarajan | G06F 16/258 |
| 2020/0065857 A1* | 2/2020 | Lagi | G06Q 30/0254 |
| 2020/0379787 A1* | 12/2020 | Martin | G06F 16/176 |
| 2021/0173959 A1 | 6/2021 | Gueta | |
| 2021/0281569 A1* | 9/2021 | Soon-Shiong | H04L 63/20 |
| 2022/0012268 A1* | 1/2022 | Ghoshal | G06F 16/906 |
| 2022/0237368 A1* | 7/2022 | Tran | G06N 20/00 |
| 2023/0418857 A1* | 12/2023 | Pickens | G06F 40/289 |
| 2024/0193913 A1* | 6/2024 | Saraee | G06N 3/045 |

OTHER PUBLICATIONS

Camacho, "CNNs for Text Classification", Github, May 27, 2019, pp. 1-13, https://cezannec.github.io/CNN_Text_Classification/.

Davidson, "Hate-Speech-and-Offensive_Language," Github, Mar. 29, 2019, 1 pg., https://github.com/t-davidson/hate-speech-and-offensive-language/tree/master/data.

IBM, "Interested in Watson Natural Language Understanding?", IBM.com, [Accessed Jan. 5, 2023], 1 pg., Retrieved from the Internet: <https://www.ibm.com/demos/live/natural-language-understanding/self-service/home>.

IBM, "Watson Natural Language Understanding—Details—Singapore", IBM.com, [Accessed Dec. 28, 2022], pp. 1-10, Retrieved from the Internet: <https://www.ibm.com/sg-en/cloud/watson-natural-language-understanding/details>.

IBM, "Watson Natural Language Understanding," IBM.com, [Accessed Jan. 5, 2023], 9 pgs., Retrieved from the Internet: <https://www.ibm.com/cloud/watson-natural-language-understanding>.

Kaggle, "Toxic Comment Classification Challenge," Kaggle.com, [Accessed Jan. 5, 2023], 3 pgs., Retrieved from the Internet: <https://www.kaggle.com/c/jigsaw-toxic-comment-classification-challenge>.

Kim, "Understanding how Convolutional Neural Network (CNN) perform text classification with word embeddings", Towards Data Science, Dec. 2, 2017, pp. 1-6, https://towardsdatascience.com/understanding-how-convolutional-neural-network-cnn-perform-text-classification-with-word-d2ee64b9dd0b.

Lee, et. al., "Making sense of text: artificial intelligence-enabled content analysis", ResearchGate, European Journal of Marketing, vol. 54, No. 3, pp. 615-644, Feb. 2020, https://www.researchgate.net/publication/339475726.

Reddit, "Complete Public Reddit Comments Corpus," Reddit.com, Jul. 2015, 2 pgs., https://archive.org/details/2015_reddit_comments_corpus.

Tripathi, et. al., "Detecting Sensitive Content in Spoken Language", 6th IEEE International Conference on Data Science and Advanced Analytics (DSAA), IEEE, Oct. 5-8, 2019, pp. 374-381, https://assets.amazon.science/f4/aa/c5a71486497cb7e5823f4b2d7442/detecting-sensitive-content-in-spoken-language.pdf.

\* cited by examiner

AUTOMATIC PROCESSING OF MEETINGS FOR CONFIDENTIAL CONTENT

BACKGROUND

The present invention relates generally to the field of computing, and more particularly to digital content processing.

Partially due to the remote work trend, many organizations may be conducting many of their most important meetings, public service announcements, and lectures, amongst other discussions through online software which may enable the digital content to be replayed by a plurality of consumers within the organization. Often times, these meetings may be recorded with portions of the meeting being watchable only under certain conditions. The current approach usually requires post processing of the meeting content for each specific group of consumers, specific encryption devices to encrypt audio data, unique authentications with specific equipment, and/or encoding and/or decoding equipment to encode and/or decode the protected data. The current approaches may be inefficient, suffer from human error, and/or institute barriers which may reduce the number of consumers able to access a digital content replay.

Accordingly, a system is needed for automatically producing post processing meeting content through Artificial Intelligence (AI). More specifically, a system that may be able to recognize sensitive data segments in digital content based on a role of a content producer and a group of content consumer may be beneficial.

SUMMARY

Embodiments of the present invention disclose a method, computer system, and a computer program product for digital content processing. The present invention may include building a sensitive sentence classification model. The present invention may include receiving digital content, wherein the digital content is intended for one or more groups of content consumers. The present invention may include processing the digital content using the sensitive sentence classification model. The present invention may include generating consumer specific digital content for each of the one or more groups of content consumers.

In another embodiment, the method may include training the sensitive sentence classification model using a customized training dataset and an existing dataset, wherein the customized training dataset is comprised of keywords and entities derived from organizational information, wherein the existing dataset is comprised of one or more existing sensitive word datasets sourced from one or more publicly available resources, and wherein the customized training dataset and the existing dataset are preprocessed using a Word2Vec algorithm.

In a further embodiment, the method may include storing the digital content received in its original form in an original content database, identifying one or more sensitive data segments using the sensitive sentence classification model, and storing the one or more sensitive data segments in a processed content database according to at least one or more of data type, timestamp, or corresponding consumer roles, wherein the corresponding consumer roles include at least one of the one or more groups of content consumers.

In yet another embodiment, the method may include assigning a plurality of consumers within an organization to the one or more groups of content consumers based on a hierarchal structure of the organization constructed based on an analysis of organizational information, and displaying the consumer specific digital content to a plurality of consumers, wherein each of the plurality of consumers may access the consumer specific digital content corresponding to their content consumer group.

In addition to a method, additional embodiments are directed to a computer system and a computer program product for automatically post processing digital content for sensitive data segments for different groups of content consumers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

The following described exemplary embodiments provide a system, method and program product for digital content processing. As such, the present embodiment has the capacity to improve the technical field of digital content processing and machine learning by automatically post processing digital content for sensitive data segments for different groups of content consumers. More specifically, the present invention may include building a sensitive sentence classification model. The present invention may include receiving digital content, wherein the digital content is intended for one or more groups of content consumers. The present invention may include processing the digital content using the sensitive sentence classification model. The present invention may include generating consumer specific digital content for each of the one or more groups of content consumers.

As described previously, partially due to the remote work trend, many organizations may be conducting many of their most important meetings, public service announcements, lectures, amongst other discussions through online software which may enable the digital content to be replayed by a plurality of consumers within the organization. Often times, these meetings may be recorded with portions of the meeting being watchable only under certain conditions. The current approach usually requires post processing of the meeting content for each specific group of consumers, specific encryption devices to encrypt audio data, unique authentications with specific equipment, and/or encoding and/or decoding equipment to encode and/or decode the protected data. The current approaches may be inefficient, suffer from human error, and/or institute barriers which may reduce the number of consumers able to access a digital content replay.

Accordingly, a system is needed for automatically producing post processing meeting content through Artificial Intelligence (AI). More specifically, a system that may be able to recognize sensitive data segments in digital content based on a role of a content producer and a group of content consumers.

Therefore, it may be advantageous to, among other things, build a sensitive sentence classification model and receive digital content, wherein the digital content is intended for one or more groups of content consumers, process the digital content using the sensitive sentence classification model, and generate consumer specific digital content for each of the one or more groups of content consumers.

According to at least one embodiment, the present invention may improve the processing of digital content by providing a system that may recognize sensitive data segments in a digital content (e.g., video and/or audio of a web conference) specifically based on the roles of the content producer and content consumer (e.g., the speaker and the audience).

According to at least one embodiment, the present invention may improve post processing meeting videos for confidential content by keeping and/or masking in a role-base fashion identified sensitive data segments in replayed digital content.

According to at least one embodiment, the present invention may improve the monitoring of confidential content in meetings conducted through online software by enabling a content provider and/or speaker to optionally and/or manually trigger the marking of sensitive data segments in addition to automatic recognition using a Sensitive Sentence Classification Model (SSCM).

According to at least one embodiment, the present invention may improve the efficiency by which digital content may be replayed by a plurality of consumers wherein the plurality of consumers perform different roles within an organization by applying different filter rules for different roles using a Sensitive Sentence Classification Model (SSCM) as opposed to editing the video separately for each of the plurality of roles.

According to at least one embodiment, the present invention may improve generating consumer specific digital content for different consumer groups by training the SSCM model using a customized training dataset and an existing dataset, wherein the customized training dataset is comprised of keywords and entities derived from organizational information, wherein the existing dataset is comprised of one or more existing sensitive word datasets sourced from one or more publicly available resources, and wherein the customized training dataset and the existing dataset are preprocessed using a Word2Vec algorithm.

According to at least one embodiment, the present invention may improve processing digital content using a SSCM model by storing the digital content received in its original for in an original content database; identifying one or more sensitive data segments using the sensitive sentence classification model; and storing the one or more sensitive data segments in a processed content database according to at least one or more of data type, timestamp, or corresponding consumer roles, wherein the corresponding consumer roles include at least one of the one or more groups of content consumers.

According to at least one embodiment, the present invention may improve identifying sensitive data segments by enabling a content producer to manually identify sensitive content within a user interface and enabling content consumers to manually mark sensitive content which may be stored in a processed content database and used to retrain the SSCM.

Figure 1:
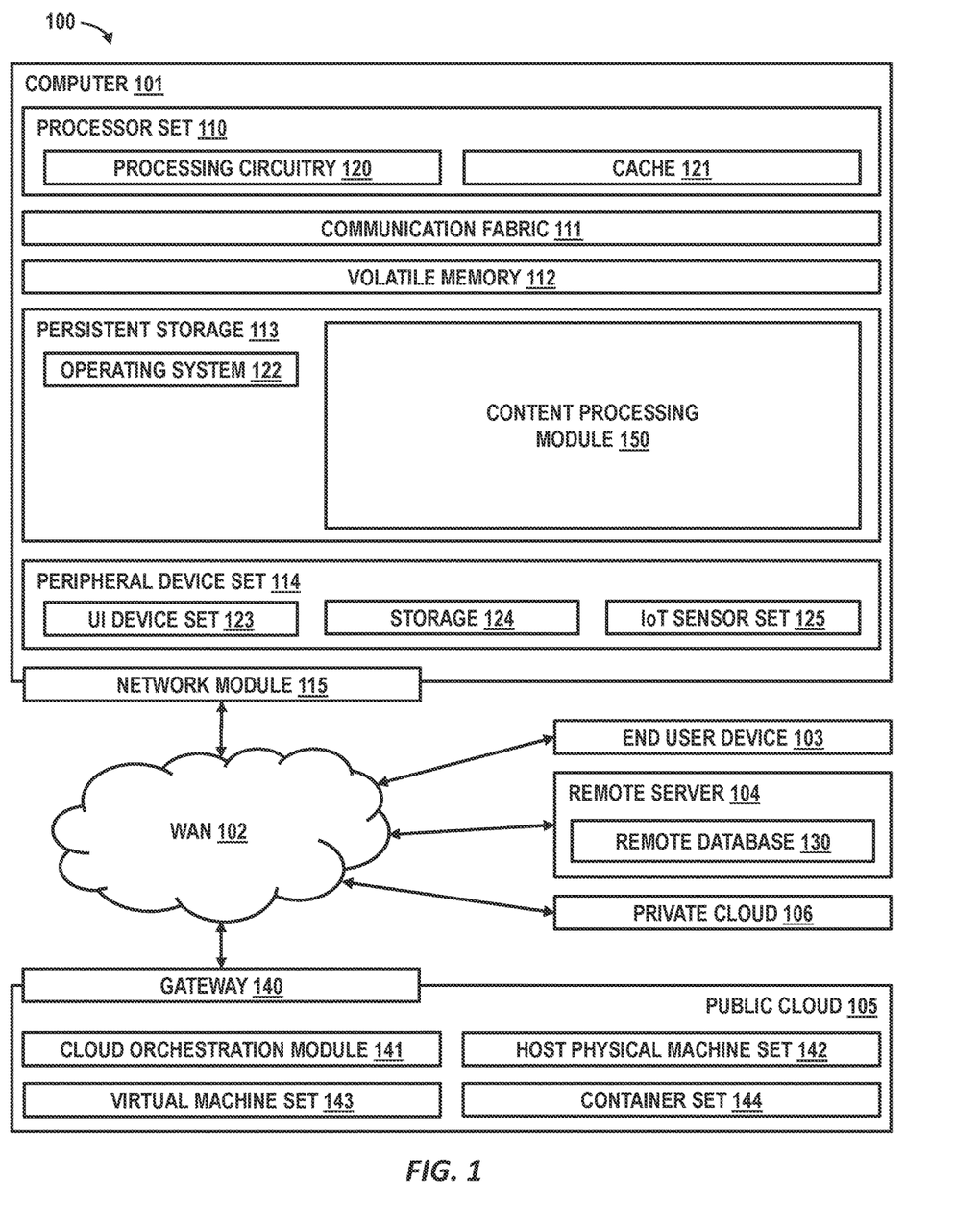
FIG. 1 depicts a block diagram of an exemplary computing environment according to at least one embodiment.

Referring to FIG. 1, Computing environment 100 contains an example of an environment for the execution of at least some of the computer code involved in performing the inventive methods, such as automatically post processing digital content for sensitive data segments for different groups of content consumers using a content processing module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the computer environment 100 may use the content processing module 150 to automatically post process digital content for sensitive data segments according to different groups of content consumers. The content processing method is explained in more detail below with respect to FIGS. 2 and 3.

Figure 2:
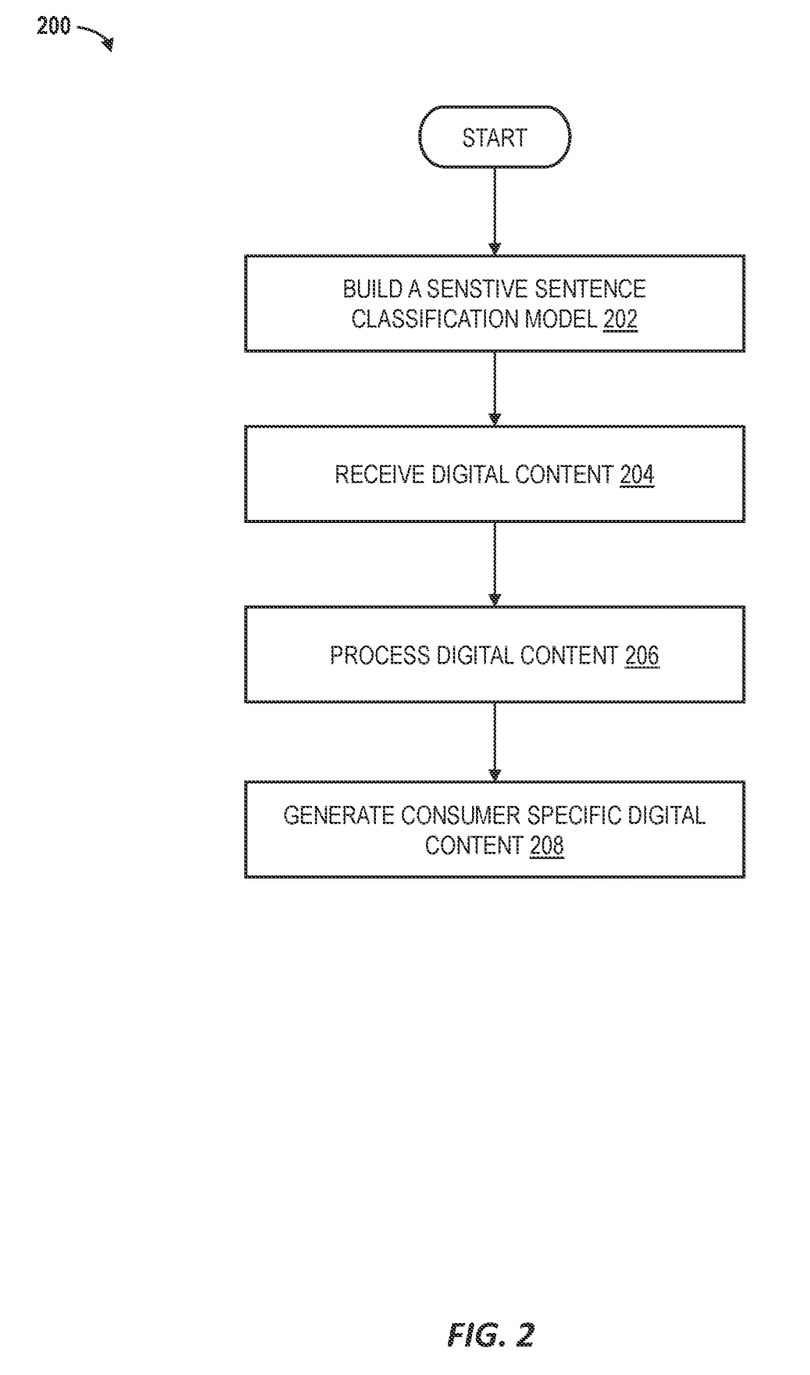
FIG. 2 is an operational flowchart illustrating a process for digital content processing according to at least one embodiment.

Referring now to FIG. 2, an operational flowchart illustrating the exemplary content processing process 200 used by the content processing module 150 according to at least one embodiment is depicted.

At 202, the content processing module 150 builds a sensitive sentence classification model (SSCM) (e.g., classification model). The content processing module 150 may build the SSCM (e.g., classification model) to enable identification of sensitive data segments within digital content specifically based on the roles of both speakers and/or groups of consumers within an organization. The organization may be a business entity, a non-profit organization, an educational institution, or any other organization which may utilize online software in conducting meetings between constituents. Constituents may be comprised of content producers (e.g., management, organizational leaders, professors, teachers), the content producers may be the speakers and/or constituents of the organization presenting within meetings, and content consumers (e.g., employees, volunteers, students). The content consumers may be the organizational participants for which the digital content may be produced. The content consumers may also include consumers external to the organization, such as clients and/or the general public. The training process which may be involved in building the SSCM (e.g., classification model) may be described in more detail in FIG. 3.

The content processing module 150 may utilize one or more linguistic analysis techniques and/or one or more deep learning models with one or more existing sensitive word datasets and/or a customized training dataset in building the SSCM (e.g., classification model) for identifying audio and/or visual content within digital media content of the organization which may contain sensitive words and/or sensitive visual content. The one or more sensitive words may be identified generally using the one or more existing sensitive word datasets and/or may be identified specifically pertaining to consumer role settings using the customized training dataset utilized in building the SSCM (e.g., classification model). As will be explained in more detail below and in FIG. 3, the one or more existing sensitive word datasets may be sourced from one or more publicly available datasets and the customized training dataset may be based on at least predefined consumer data, consumer roles, sensitive words, amongst other data.

The one or more linguistic analysis techniques may include, but are not limited to including, a machine learning model with Natural Language Processing (NLP), Latent Dirichlet Allocation (LDA), speech-to-text, Hidden markov models (HMM), N-grams, Speaker Diarization (SD), Semantic Textual Similarity (STS), Keyword Extraction, amongst other analysis techniques, such as those implemented in IBM Watson® (IBM Watson and all Watson-based trademarks are trademarks or registered trademarks of International Business Machines Corporation in the United States, and/or other countries), IBM Watson® Speech to Text, IBM Watson® Tone Analyzer, IBM Watson® Natural Language Understanding, and IBM Watson® Natural Language Classifier, amongst other implementations. As will be described in more detail below, the one or more linguistic analysis techniques may be utilized in generating a text transcript of the audio content which may be filtered using the SSCM (e.g., classification model)

The one or more deep learning models which may be utilized by the content processing module 150 may include, but are not limited to including, a Convolutional Neural Network (CNN), amongst other Image Recognition Neural Network deep learning models for images, objects, and/or other visual content. As will be described in more detail below, the one or more deep learning models may be utilized in identifying visual content which may be filtered using the SSCM (e.g., classification model). The CNN may also be utilized for processing during the training process of the SSCM (e.g., classification model) which will be described in more detail below and in FIG. 3.

The content processing module 150 may utilize the one or more linguistic analysis techniques and/or the one or more deep learning models described above in extracting meaning and/or metadata from unstructured text data. The unstructured text data may include organizational information received from the organization. The organizational information may include, but is not limited to including, internal documentation, an organizational directory, a management chain, job descriptions, employee titles, user profiles, text files, audio files, and/or video files, amongst other organizational information. The content processing module 150 may not utilize the one or more linguistic analysis techniques in performing text analytics on the unstructured text data and/or any other data received from the organization until receiving consent from the organization and/or an authorized user within the organization. The content processing module 150 utilizing the one or more linguistic analysis techniques may extract at least, categories, concepts, classifications, metadata, entities, keywords, sentiment, semantic roles, emotions, relations, and/or syntax.

The content processing module 150 may additionally utilize a plurality of manually identified spoken language examples, including sensitive and non-sensitive content in building the customized training dataset. The content processing module 150 may utilize a template (e.g., base text) and utilizing the one or more linguistic analysis techniques identify entities and/or keywords in the template (e.g., base text). Additionally, the content processing module 150 may generate variations of the template (e.g., base text) by using synonyms and/or antonyms to replace the entities and/or keywords in the base text (e.g., template). The content processing module 150 may perform preprocessing of the variations of the template (e.g., base text) and sensitive and/or non-sensitive content received from the existing dataset. The content processing module 150 may preprocess this input using an NLP model, such as, but not limited to a Word2Vec model. The NLP model may utilize a text corpus as input and produce an output which may be classified as either a sensitive or a non-sensitive sentence by the CNN. For example, the content processing module 150 may utilize the Word2Vec model, the algorithm may accept a text corpus as input and output a vector representation of each word of the text corpus as output which may be classified as either sensitive or non-sensitive by the CNN.

The content processing module 150 may also utilize consumer role settings in building the SSCM (e.g., classification model). The consumer role settings may be based on a hierarchal structure of the organization. The hierarchal structure of the organization may be created based on a hierarchal analysis of the organization utilizing at least the organizational information described in detail above amongst other data provided to the content processing module 150 by the organization. The content processing module 150 may not perform the hierarchal analysis of the organization prior to receiving consent from the organization and/or an authorized user of the organization. The content processing module 150 may utilize one or more tools and/or techniques, such as, but not limited to, the Galton-Watson branching process, the Lightweight Directory Access Protocol (LDAP), amongst other hierarchal analysis techniques, in performing the hierarchal analysis of the organization. The hierarchal structure of the organization may be a directory information tree (DIT) illustrating a position of the plurality of users relative to one another within the organization. The hierarchal structure may be utilized in designating information which may be considered sensitive for groups of the plurality of consumers based on each group's role within the organization. For example, compensation information may be considered sensitive for consumers within the Sales Group of the organization but not considered sensitive for consumers working within Payroll Group of the organization, such that the SSCM (e.g., classification model) may block compensation discussions within the digital content for the Sales Group but not for the Payroll Group. Another example may relate to an organization's goal of maintaining a trade secret, such that information such as formulas, practices, processes, designs, instruments, patterns, and/or compilations of information may be considered sensitive to different groups within the plurality of consumers.

The SSCM (e.g., classification model) may also be utilized in blocking and/or masking visual content identified within the digital content by the one or more deep learning models described above. For example, in an internal meeting within the organization, the content processing module 150 may identify one or more number figures within a screen sharing deck using the one or more deep learning models. In this example the SSCM (e.g., classification model) may mask and/or block an annual revenue number within the one or more number figures determined to be a sensitive number figure for at least a portion of the content consumers.

As will be explained in more detail below, the consumer role settings may include pre-defined consumer data, such as roles and sensitive words, which may be utilized by the SSCM (e.g., classification model) in generating desired output to a processed content database. For example, the pre-defined consumer data for XXX Manager may include:

{
"keywords": ["confidential", "Contract", "XXX company", "Deal"],
"roles": ["XXX manager"]
}

In another embodiment, content may be sensitive at one time but not at a later time. As will be explained in more detail below, the content producer (e.g., management, organizational leaders, professors, teachers) may designate different masking periods for different groups of content consumers. For example, a professor may produce digital content intended for a group of teacher assistants and students before an exam. The digital content may be only available in part to students before the exam but available in its entirety after an exam.

At 204, the content processing module 150 receives digital content. The content processing module 150 may receive digital content which may be produced by the content producers (e.g., management, organizational leaders, professors, teachers) for one or more groups of content consumers (e.g., employees, volunteers, students). The content processing module 150 may receive the digital content in at least an internet browser, dedicated software application, and/or as an integration with a third party software application. The third party software application may include be web conferencing and/or video recording software utilized by the organization in conducting meetings, announcements, and/or producing and/or distributing digital content to the content consumers (e.g., employees, volunteers, students).

The digital content may be produced for one or more groups of content consumers. The content producers (e.g., management, organizational leaders, professors, teachers) may identify the one or more groups of content consumers (e.g., employees, volunteers, students) for which the digital content is intended in a user interface displayed in at least the internet browser, dedicated software application, and/or the third party software application. The content processing module 150 may also identify the one or more groups of content consumers for which the content is intended based on the hierarchal structure of the organization generated at step 202. As will be explained in more detail below, the content processing module 150 may utilize a content extractor in extracting at least the audio and/or visual content from the digital content received. The SSCM (e.g., classification model) may then be utilized in identifying sensitive data segments within the audio and/or visual content corresponding to the one or more groups of content consumers. As will be explained in more detail below with respect to step 206, the content producers (e.g., management, organizational leaders, professors, teachers) may also manually trigger content masking and/or blocking within the user interface. The content producer may manually select at least one of the one or more groups within the user interface during production of the digital content for particular segments which may be automatically stored in the processed content database by the content processing module 150.

At 206, the content processing module 150 processes the digital content. The content processing module 150 may process the digital content for each group of content consumers using the SSCM (e.g., classification model) and two or more content databases. The two or more content databases may include at least an original content database and a processed content database. The two or more content databases may be maintained by the content processing module within database 130. The original content database may store the digital content in its original form as recorded by the content producers. The processed content database may store the sensitive data segments and their corresponding consumer roles identified by the SSCM (e.g., classification model).

The digital content may be comprised of at least audio and/or video content. The content processing module 150 may utilize the one or more linguistic analysis techniques, such as, speech-to-text in generating a text transcript of the audio content which may be filtered using the SSCM (e.g., classification model) in identifying sensitive content. The content processing module 150 may utilize the one or more linguistic analysis techniques, such as speech-to-text, and/or the one or more deep learning models to employ visual analysis techniques, such as image and/or object recognition, in identifying visual content which may be filtered using the SSCM (e.g., classification model). For example, sensitive visual content may be detected while a content producer is sharing their screen with clients during a product presentation. The content producer may have forgot to close out one or more internal confidential documents. In this example, once the content processing module 150 detects the documents include the "confidential" keyword the content processing module 150 may mask and/or block the one or more internal confidential documents to ensure no sensitive data is leaked. The content processing module 150 may store the content identified within the audio and/or visual content that may contain sensitive information based on the SSCM (e.g., classification model) in the processed content database.

The processed content database may store the output of the SSCM (e.g., classification model). The content processing module 150 may store the sensitive data segments according to data type, timestamp/location within the digital content and/or corresponding consumer roles. For example, the content processing module 150 may store a sensitive audio segment in the processed content database using:

```
{
"type": "audio",
"startTime": "00:01:23",
"endTime": "00:01:59",
"keyWords": ["profit", "cost"],
"appliedRoles": ["general public", "non-employee"]
}
``` and a sensitive video segment in the processed content database using:

```
{
"type": "video",
"startTime": "00:10:23",
"endTime": "00:10:44",
"keyWords": ["confidential", "Contract", "XXX company", "Deal"],
"appliedRoles": ["XXX manager"]
}
```

The content processing module 150 may also store the one or more sensitive data segments manually identified by the producer within the processed content database. Additionally, the content processing module 150 may identify additional content segments which may be similar to the one or more data segments identified by the producer using the one or more linguistic analysis techniques described at step 202. The content processing module 150 may present a list to the producer in the user interface of the sensitive data segments manually identified and/or identified by the content processing module 150 for each group within the content consumers (e.g., employees, volunteers, students). The content producer (e.g., management, organizational leaders, professors, teachers) may edit and/or approve each of the one or more sensitive data segments for each group.

As will be explained in more detail below with respect to step 208, the content processing module may utilize the digital content saved in the original content database and the sensitive data segments stored in the processed content database in generating the consumer specific digital content.

In another embodiment, the content processing module 150 may utilize a delay in processing the digital content such that it may be received in real time and processed using the SSCM (e.g., classification model) during the intervening delay such that the content processing module 150 may be utilized for digital content intended for playback as well as digital content intended to be consumed in real time, such as organizational meetings.

At 208, the content processing module 150 generates consumer specific digital content. The content processing module 150 may generate the consumer specific digital content for each consumer group according to the consumer role settings.

The content processing module 150 may generate the consumer specific digital content for each of the one or more consumer groups by retrieving the digital content in its original form as recorded by the content producer from the original content database and the one or more sensitive data segments, including time stamps, corresponding consumer roles, and/or associated data stored in the processed content database. Accordingly, the content processing module 150 may determine which video objects and/or audio time periods may require masking and/or blocking for each of the one or more consumer groups.

The content processing module 150 may utilize an output content processor in masking and/or blocking audio and/or visual sensitive data segments. The output content processor may mask and/or block audio and/or visual sensitive data segments hiding identified keywords in the digital content transcript, mute sound for the time periods associated with audio sensitive data segments, remove complete segments from the digital content, scrambling, substitution, amongst other methods of masking and/or blocking digital content.

The content processing module 150 may further utilize the output content processor in transmitting and/or displaying the consumer specific content to each of the plurality of consumers according to consumer grouping within the user interface presented by the internet browser, dedicated software application, and/or third party software application described in detail above with respect to step 204. The content processing module 150 may also generate unique download links for each content consumer to download via http, https, and/or ftp. The content processing module 150 may receive approval for each version of the consumer specific content generated from the content producers (e.g., management, organizational leaders, professors, teachers) and/or another authorized party within the organization prior to transmitting and/or displaying the consumer specific content. The content processing module 150 may also require content consumer group verification prior to enabling viewing by the content consumer. The content processing module 150 may receive consumer group verification based on a consumer profile associated with a device, a consumer profile associated with the internet browser, software application, and/or third party application, and/or manual selections made by the consumer within the user interface.

The content processing module 150 may also enable content consumers to manually mark sensitive content within the consumer specific content. The content processing module 150 may request additional feedback from the consumer with respect to the sensitive content identified and store the sensitive data segment and associated data within the customized training dataset. The content processing module 150 may utilize additional sensitive data segments identified in retraining the SSCM (e.g., classification model), the training process being described in greater detail below with respect to FIG. 3.

Figure 3:
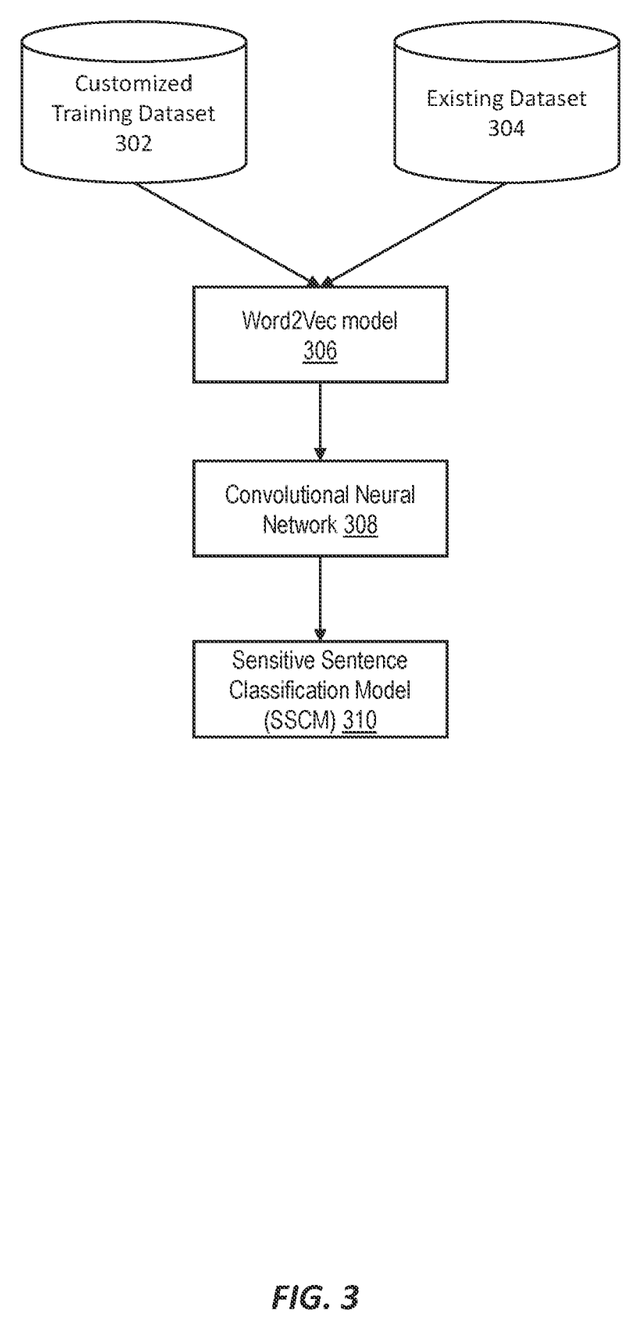
FIG. 3 depicts a block diagram and flowchart illustrating a training process utilizing some of the components discussed in FIG. 2 according to at least one embodiment.

Referring now to FIG. 3, provides a block diagram and flowchart illustrating the training process of the SSCM (e.g., classification model) utilizing some of the components discussed in FIG. 2 according to at least one embodiment.

As described in detail above with respect to at least step 202, building the sensitive sentence classification model (SSCM) 310 (e.g., classification model) to enable identification of sensitive data segments within digital content specifically based on the roles of both speakers and/or groups of consumers within an organization includes a training process starting with a customized training dataset 302 and an existing dataset 304.

The customized training dataset 302 may be built based on at least predefined consumer data, consumer roles, sensitive words, amongst other data which may be extracted utilizing the one or more linguistic analysis described in detail at step 202. The one or more linguistic analysis techniques may extract meaning and/or metadata from unstructured text data received from the organization, such as the organizational information described at step 202. The one or more linguistic analysis techniques may extract meaning and/or metadata using text analytics to identify entities, such as, but not limited to, consumers, producers, companies, organizations, cities, geographic features, and/or other entities from the organizational information. Additionally, linguistic analysis techniques such as IBM Watson® Natural Language Processing® (IBM Watson and all Watson-based trademarks are trademarks or registered trademarks of International Business Machines Corporation in the United States, and/or other countries) may be utilized in extracting keywords associated with each of the identified entities. The identified entities and keywords may be manually identified as either sensitive or non-sensitive and used to generate variations by changing the entities and/or keywords using synonyms or antonyms. The customized training data set 302 being comprised of the identified entities and keywords as well as the generated variations. The existing dataset 304 may be built using one or more existing sensitive word datasets sourced from one or more publicly available datasets.

The customized training dataset 302 and the existing dataset 304 may then be provided as input to an NLP model, such as the Word2Vec model 306 depicted for preprocessing. The preprocessing of the customized training dataset 302 and the existing dataset 304 by the Word2Vec algorithm may utilize a neural network model to learn word associations, sensitive or non-sensitive, from the training datasets such that the word embeddings output by the algorithm may enable the grouping of vectors for similar words. In the case of audio content, the training process may require an additional speech-to-text step which may be performed using IBM Watson® Speech to Text (IBM Watson and all Watson-based trademarks are trademarks or registered trademarks of International Business Machines Corporation in the United States, and/or other countries).

A Convolutional Neural Network (CNN) 308 may then be used for sentence classification. The CNN 308 may utilize a n×k representation of sentences, wherein n is a number of words and k is the number of vectors for each word. The CNN may additionally utilize static and non-static channels, a convolutional layer with multiple filter widths and feature maps, max-over time pooling, and a fully connected layer with dropout and SoftMax output in determining whether a sentence is sensitive or a non-sensitive sentence.

Accordingly, digital content for each group of content consumers may be automatically processed using the SSCM 310 (e.g., classification model) such that sensitive data segments may be masked and/or blocked according for different content consumer groups.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method performed by a processing device for processing digital content, the method comprising:
    building a sensitive sentence classification model;
    receiving a digital content, wherein the digital content is intended for one or more groups of content consumers identified by a content producer within a user interface;
    assigning a plurality of consumers within an organization to the one or more groups of content consumers based on a hierarchal structure of the organization constructed based on an analysis of organizational information;
    processing the digital content using the sensitive sentence classification model;
    generating a consumer specific digital content for each of the one or more groups of content consumers; and
    displaying the consumer specific digital content to a plurality of consumers, wherein each of the plurality of consumers may access the consumer specific digital content corresponding to their content consumer group.

2. The method of claim 1, wherein building the sensitive sentence classification model further comprises:
    training the sensitive sentence classification model using a customized training dataset and an existing dataset, wherein the customized training dataset and the existing dataset are preprocessed using a Word2Vec algorithm, and wherein the customized training dataset is comprised of keywords and entities derived from organizational information, and wherein the existing dataset is comprised of one or more existing sensitive word datasets sourced from one or more publicly available resources.

3. The method of claim 2, wherein the customized training dataset is further comprised of a plurality of manually identified spoken language examples.

4. The method of claim 1, wherein processing the digital content using the sensitive sentence classification model further comprises:
    storing the digital content received in its original form in an original content database;
    identifying one or more sensitive data segments using the sensitive sentence classification model; and
    storing the one or more sensitive data segments in a processed content database according to data type, timestamp, and corresponding consumer roles, wherein the corresponding consumer roles include at least one of the one or more groups of content consumers.

5. The method of claim 4, wherein identifying the one or more sensitive data segments further comprises:
    receiving one or more additional sensitive data segments manually identified by the content producer;
    storing the one or more additional sensitive data segments in the processed content database; and
    retraining the sensitive sentence classification model based on the one or more additional sensitive data segments manually identified by the content producer.

6. The method of claim 1, wherein an Image Recognition Neural Network deep learning model is utilized in identifying visual content within the digital content which may be filtered using the sensitive sentence classification model.

7. The method of claim 6, further comprising:
    blocking at least a portion of the visual content of the digital content for at least one of the one or more groups of content consumers.

8. The method of claim 1, further comprising:
    defining consumer role settings for each of the one or more groups of content consumers based on the hierarchal structure, wherein the consumer role settings designates information which is considered sensitive for each of the one or more groups based on roles within the organization.

9. The method of claim 1, wherein the digital content is comprised of at least audio content and visual content.

10. The method of claim 9, further comprising:
    designating, by the content producer within the user interface, a masking period for at least one of the or more groups of content consumers.

11. The method of claim 10, further comprising:
    masking, by an output content processor, at least a portion of the audio content or video content for the masking period of the at least one of the one or more groups of content consumers.

12. The method of claim 1, wherein the processing of the digital content further comprises:
    delaying the processing of the digital content received in real time for an intervening time period, wherein the digital content is processed using the sensitive sentence classification model during the intervening time period.

13. A computer system for processing digital content, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        building a sensitive sentence classification model;
        receiving a digital content, wherein the digital content is intended for one or more groups of content consumers identified by a content producer within a user interface;
        assigning a plurality of consumers within an organization to the one or more groups of content consumers based on a hierarchal structure of the organization constructed based on an analysis of organizational information;
        processing the digital content using the sensitive sentence classification model;
        generating a consumer specific digital content for each of the one or more groups of content consumers; and
        displaying the consumer specific digital content to a plurality of consumers, wherein each of the plurality of consumers may access the consumer specific digital content corresponding to their content consumer group.

14. The computer system of claim 13, wherein building the sensitive sentence classification model further comprises:
    program instructions, stored on at least one of the one or more computer-readable storage media for execution by at least one of the one or more processors via at least one of the one or more memories, to train the sensitive sentence classification model using a customized training dataset and an existing dataset, wherein the customized training dataset and the existing dataset are preprocessed using a Word2Vec algorithm, and wherein the customized training dataset is comprised of keywords and entities derived from organizational information, and wherein the existing dataset is comprised of one or more existing sensitive word datasets sourced from one or more publicly available resources.

15. The computer system of claim 13, wherein processing the digital content using the sensitive sentence classification model further comprises:
    program instructions, stored on at least one of the one or more computer-readable storage media for execution by at least one of the one or more processors via at least one of the one or more memories, to store the digital content received in its original form in an original content database;
    program instructions, stored on at least one of the one or more computer-readable storage media for execution by at least one of the one or more processors via at least one of the one or more memories, to identify one or more sensitive data segments using the sensitive sentence classification model; and
    program instructions, stored on at least one of the one or more computer-readable storage media for execution by at least one of the one or more processors via at least one of the one or more memories, to store the one or more sensitive data segments in a processed content database according to data type, timestamp, and corresponding consumer roles, wherein the corresponding consumer roles include at least one of the one or more groups of content consumers.

16. The computer system of claim 15, wherein identifying the one or more sensitive data segments further comprises:
    program instructions, stored on at least one of the one or more computer-readable storage media for execution by at least one of the one or more processors via at least one of the one or more memories, to receive one or more additional sensitive data segments manually identified by the content producer;
    program instructions, stored on at least one of the one or more computer-readable storage media for execution by at least one of the one or more processors via at least one of the one or more memories, to store the one or more additional sensitive data segments in the processed content database; and
    program instructions, stored on at least one of the one or more computer-readable storage media for execution by at least one of the one or more processors via at least one of the one or more memories, to retrain the sensitive sentence classification model based on the one or more additional sensitive data segments manually identified by the content producer.

17. A computer program product for processing digital content, comprising:
    one or more computer readable storage media, and program instructions collectively stored on the one or more computer readable storage media, the program instructions comprising:
        building a sensitive sentence classification model;
        receiving a digital content, wherein the digital content is intended for one or more groups of content consumers identified by a content producer within a user interface;
        assigning a plurality of consumers within an organization to the one or more groups of content consumers based on a hierarchal structure of the organization constructed based on an analysis of organizational information;
        processing the digital content using the sensitive sentence classification model;
        generating a consumer specific digital content for each of the one or more groups of content consumers; and
        displaying the consumer specific digital content to a plurality of consumers, wherein each of the plurality of consumers may access the consumer specific digital content corresponding to their content consumer group.

18. The computer program product of claim 17, wherein building the sensitive sentence classification model further comprises:
    program instructions, stored on at least one of the one or more computer-readable storage media, to train the sensitive sentence classification model using a customized training dataset and an existing dataset, wherein the customized training dataset and the existing dataset are preprocessed using a Word2Vec algorithm, and wherein the customized training dataset is comprised of keywords and entities derived from organizational information, and wherein the existing dataset is comprised of one or more existing sensitive word datasets sourced from one or more publicly available resources.

19. The computer program product of claim 17, wherein processing the digital content using the sensitive sentence classification model further comprises:
- program instructions, stored on at least one of the one or more computer-readable storage media, to store the digital content received in its original form in an original content database;
- program instructions, stored on at least one of the one or more computer-readable storage media, to identify one or more sensitive data segments using the sensitive sentence classification model; and
- program instructions, stored on at least one of the one or more computer-readable storage media, to store the one or more sensitive data segments in a processed content database according to data type, timestamp, and corresponding consumer roles, wherein the corresponding consumer roles include at least one of the one or more groups of content consumers.

* * * * *